United States Patent
Van Der Valk

(10) Patent No.: US 11,499,813 B2
(45) Date of Patent: Nov. 15, 2022

(54) REFOCUSING DEVICE

(71) Applicant: Nederlandse Organisatie voor toegepast-natuurwetenschappelijk onderzoek TNO, s-Gravenhage (NL)

(72) Inventor: Nicolaas Cornelis Johannes Van Der Valk, Zoetermeer (NL)

(73) Assignee: Nederlandse Organisatie voor toegepast-natuurwetenschappelijk onderzoek TNO, s-Gravenhage (NL)

( * ) Notice: Subject to any disclaimer, the term of this patent is extended or adjusted under 35 U.S.C. 154(b) by 235 days.

(21) Appl. No.: 16/754,479

(22) PCT Filed: Oct. 9, 2018

(86) PCT No.: PCT/NL2018/050664
§ 371 (c)(1),
(2) Date: Apr. 8, 2020

(87) PCT Pub. No.: WO2019/074361
PCT Pub. Date: Apr. 18, 2019

(65) Prior Publication Data
US 2020/0271435 A1    Aug. 27, 2020

(30) Foreign Application Priority Data

Oct. 9, 2017  (EP) .................................... 17195442
Mar. 22, 2018 (EP) .................................... 18163342

(51) Int. Cl.
*G01B 9/02055*    (2022.01)
*G02B 17/00*      (2006.01)
(Continued)

(52) U.S. Cl.
CPC ....... *G01B 9/02063* (2013.01); *G02B 17/002* (2013.01); *G02B 17/023* (2013.01); *G02B 17/06* (2013.01); *G02B 17/0684* (2013.01)

(58) Field of Classification Search
CPC  G01B 9/02063; G02B 17/002; G02B 17/023; G02B 17/0684; G02B 17/06
See application file for complete search history.

(56) References Cited

U.S. PATENT DOCUMENTS 4,946,280 A  *  8/1990  Horton ................... G02B 26/06
                                                    356/508
10,120,177 B2 * 11/2018 Okamoto ............. G02B 21/361
(Continued)

FOREIGN PATENT DOCUMENTS

JP   2005-175177 A    6/2005
WO   WO 2016-116147 A1  7/2016

OTHER PUBLICATIONS

European Patent Office, International Search Report in corresponding International Application No. PCT/NL2018/050664, dated Jan. 25, 2019 (3 pages).

*Primary Examiner* — Michael A Lyons
(74) *Attorney, Agent, or Firm* — Leydig, Voit & Mayer, Ltd.

(57) ABSTRACT

A focusing device comprises a base unit and a mirror unit which is translatable relative to the base unit parallel to an optical axis of the focusing device. The mirror unit is configured to receive incident light along the optical axis in a first direction and to reflect the incident light parallel with the optical axis in said first direction. The mirror unit comprises at least four mirrors, at least one of the mirrors being curved.

13 Claims, 4 Drawing Sheets

(51) Int. Cl.
  *G02B 17/02* (2006.01)
  *G02B 17/06* (2006.01)

(56) References Cited

U.S. PATENT DOCUMENTS

| | | |
|---|---|---|
| 2004/0141184 A1 | 7/2004 | Ueki |
| 2009/0009772 A1* | 1/2009 | Tanimura ................ G01J 9/02 356/491 |
| 2010/0078577 A1 | 4/2010 | Moriya et al. |
| 2017/0010162 A1* | 1/2017 | Shiramizu ................ G01J 9/02 |
| 2017/0280544 A1 | 9/2017 | Ueno et al. |
| 2017/0325325 A1* | 11/2017 | Lambert ................ G02B 7/182 |
| 2020/0187773 A1* | 6/2020 | Katashiba .......... G01B 9/02063 |

* cited by examiner

REFOCUSING DEVICE

CROSS-REFERENCE TO RELATED APPLICATIONS

This patent application is a U.S. National Phase of PCT International Application No. PCT/NL2018/050664, filed Oct. 9, 2018, which claims priority to European Application No. 18163342.1, filed Mar. 22, 2018, and European Application No. 17195442.3, filed Oct. 9, 2017, which are expressly incorporated by reference in their entireties, including any references contained therein.

FIELD OF THE INVENTION

The present invention relates to a refocusing device. More in particular, the present invention relates to a refocusing device which is particularly, but not exclusively, suitable for use in an interferometer, for example an interferometer for use in space applications.

BACKGROUND OF THE INVENTION

Such refocusing devices are known per se. For example, a single lens, a single mirror or a double mirror may be used. However, it has been found that the known refocusing devices are not satisfactory for scientific observations. The use of a refocusing device in scientific observations puts strict requirements on the allowable impact on the focal path length. In this respect, it is desired to refocus during a scientific observation while minimizing the impact of the refocusing on the measurements.

BRIEF SUMMARY OF THE INVENTION

Accordingly, the present invention provides a focusing device, comprising a base unit and a mirror unit, wherein the mirror unit is translatable relative to the base unit parallel to an optical axis of the focusing device, wherein the mirror unit is configured to receive incident light along the optical axis in a first direction and to reflect the incident light parallel with the optical axis in said first direction, wherein the mirror unit comprises an even number of mirrors, wherein at least one of the mirrors is curved, and wherein the number of mirrors is equal to at least four.

By providing an even number of mirrors which is equal to four or greater than four, instead of one or two mirrors, a refocusing device can be obtained which can be used during scientific observations. In particular, a refocusing device can be obtained which suffers less from straylight, which has a low sensitivity to parasitic movements and which does not have a central obscuration.

In the focusing device of the invention, the number of mirrors may be equal to four, but embodiments having six, eight or even more mirrors are also possible.

In the focusing device according to the present invention, the incident light may be received by a first mirror and be reflected to a second mirror, while the second mirror may reflect the light to a third mirror, which third mirror may reflect the light to a fourth mirror.

The first mirror and the second mirror may be parallel to each other. In addition, the third mirror and the fourth mirror may be parallel to each other. The first mirror and the fourth mirror may together define an angle of approximately 90°. This results in a very advantageous and compact geometry. Such a geometry allows the input and the output beam to be co-linear or overlapping along an optical axis, in particular of an interferometer.

The first mirror may be curved so as to provide optical power. In alternative embodiments, the second, third and/or fourth mirror may be curved. The curved mirror may be concave. Such a curvature and the resulting optical power may be small, for example in the order of F/50, although other optical powers, for example ranging from F/70 to F/30, may also be used.

The invention additionally provides an interferometer comprising a focusing device as described above.

BRIEF DESCRIPTION OF THE DRAWINGS

The invention will further be explained with reference to the drawings, in which.

DETAILED DESCRIPTION OF THE DRAWINGS

Figure 1:
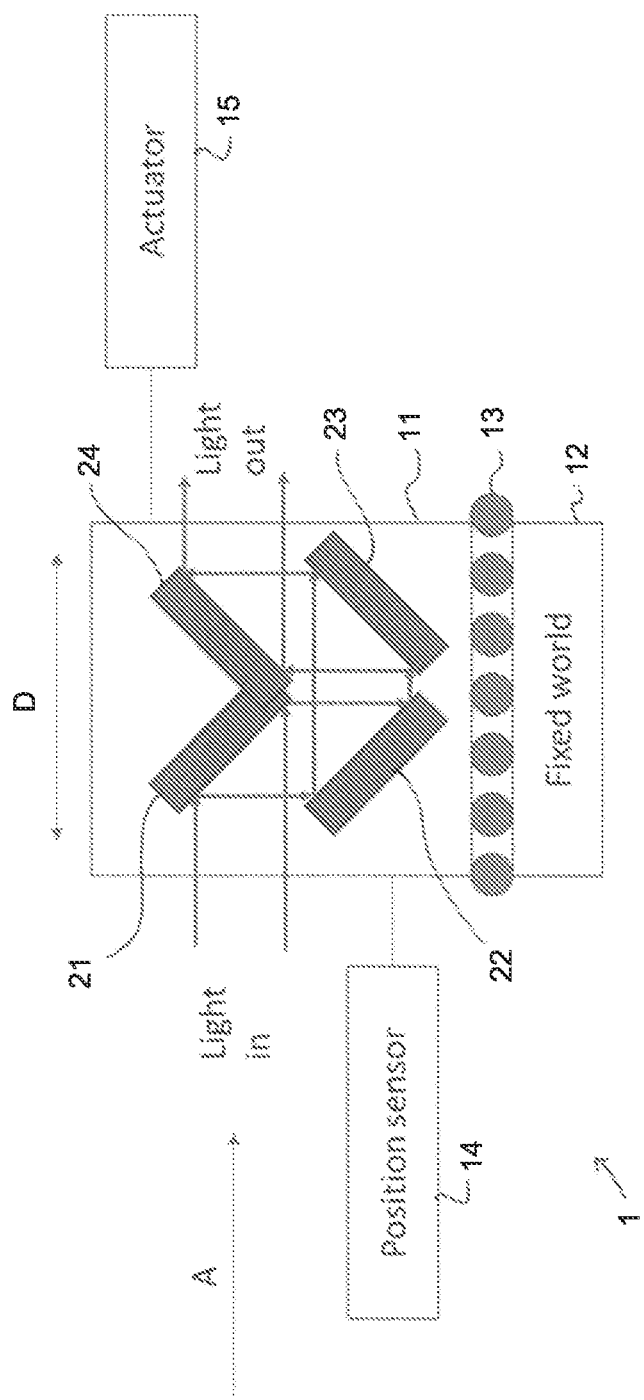
FIG. 1 schematically shows an exemplary embodiment of a focusing device according to the invention.

The exemplary focusing device 1 schematically illustrated in FIG. 1 is shown to comprise a base unit 12 and a mirror unit 11. The mirror unit 11 is translatable relative to the base unit 12 and may be coupled to the base unit 12 by a roller ball mechanism or a similar mechanism allowing a linear movement. The translation is parallel to the optical axis A of the focusing device.

The focusing device 1 of FIG. 1 is shown to further comprise a position sensor 14 for sensing the position of the mirror unit 11 relative to the base unit 12, which represents the "fixed world". In addition, the embodiment of FIG. 1 comprises an actuator 15 for causing a movement of the mirror unit 11, in the direction of the arrow D, defining an optical axis so as to cause a refocusing of the incident light by a weak optical lens action. As can be seen, the translational movement represented by the arrow D and the optical axis represented by the axis A are substantially parallel and may coincide.

The mirror unit 11 is configured to receive incident light along the optical axis A in direction of incidence and to reflect the incident light, parallel with the optical axis A, in the same direction. In preferred embodiments of the invention, therefore, the light entering the mirror unit 11 and the light exiting the mirror unit 11 share a common axis or have at least parallel axes, while light entering the mirror unit 11 and the light exiting the mirror unit 11 enclose an angle equal to 0.

In accordance with the invention, the mirror unit 11 of FIG. 1 comprises four mirrors 21, 22, 23 and 24. In a preferred embodiment, at least one of the mirrors is curved, preferably mirror 21.

The incident light, which can be coincidental with the optical axis A, is received by the first mirror 21 and reflected to the second mirror 22. The second mirror 22 reflects the light to the third mirror 23. In turn, the third mirror 23 reflects the light to the fourth mirror 24. It can be seen that the light reflected by the fourth mirror 24 and output by the mirror unit 11 is at least parallel with the optical axis A, while this light may be coincidental with the optical axis A. Although configurations are possible in which the light output by the mirror unit 11 is not parallel with the optical axis A, any deviation from parallelism or from coincidence with the optical axis A can cause an increased sensitivity to parasitic motion.

As illustrated in FIG. 1, in the embodiment shown the first mirror 21 and the second mirror 22 are substantially parallel to each other. Similarly, the third mirror 23 and the fourth mirror 24 are parallel to each other. The first mirror 21 and the fourth mirror 24 together define an angle of approximately 90°.

At least one of the mirrors, for example the first mirror 21, may be curved and may for example be concave, so as to provide optical power. The curved mirror may have an optical power between F/30 and F/70, for example approximately F/50, although another optical power may also be used. A small curvature results in a high sensitivity to translation of the mirror unit 11 and a low sensitivity to parasitic motion.

Figure 2:
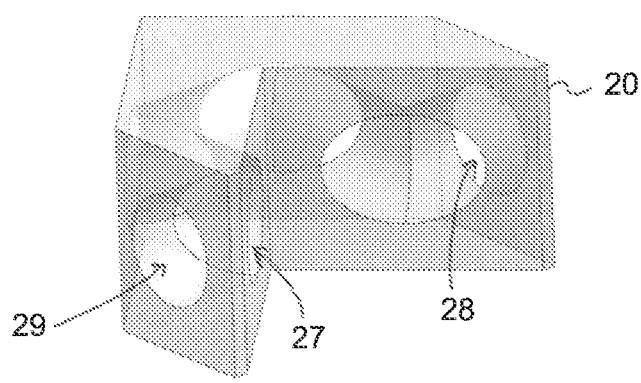
FIG. 2 schematically shows a support structure for use in the focusing device according to the invention.

The support structure 20 shown in FIG. 2 is at least partially hollow and is provided with several openings for letting light pass, for example the opening 28 through which reflected light enters the structure and the opening 29 through which reflected light exits the structure. In the embodiment shown, the support structure is hollow and provided with six openings. In addition to the light input and light output openings 28 and 29, the support structure shown is provided with an opening (e.g. 27) facing each mirror, as will be clear when comparing FIG. 2 and FIG. 3.

Figure 3:
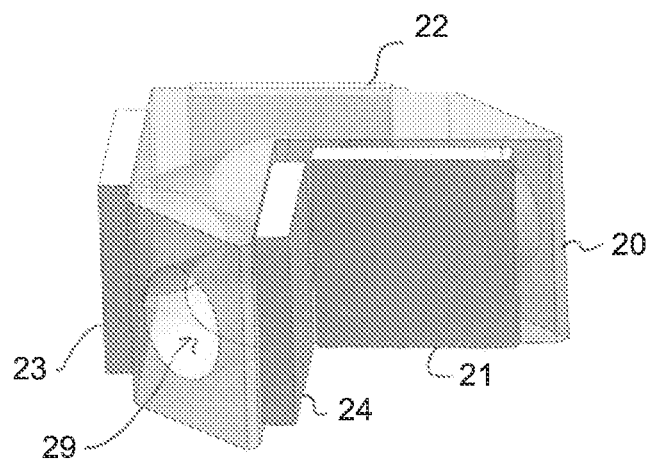
FIG. 3 schematically shows the support structure of FIG. 2 provided with four mirrors according to the invention.

In the exemplary embodiment of FIG. 3, the support structure 20 is shown to be provided with four mirrors 21-24, thus forming the main part of the mirror unit 11 shown in FIG. 1. It is clear from FIG. 3 that each of the mirrors 21-24 faces an opening in the support structure, each opening providing a passage to the hollow interior of the support structure 20. It will be understood that when more than four mirrors are used, more openings in the support structure 20 will be provided. A mirror unit having six mirrors may comprise a support structure having eight openings, for example.

Figure 4:
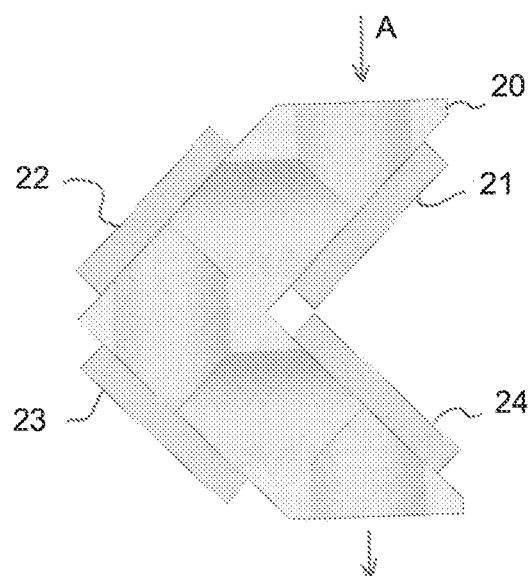
FIG. 4 schematically shows a top view of the support structure of FIG. 3 according to the invention.

FIG. 4 shows the structure 20, together with the four mirrors 21-24, in top view. It is noted that instead of a hollow support structure 25, an at least partially transparent support structure 20 may be provided. In some embodiments, the support structure 20 may be both at least partially transparent and be at least partially hollow.

Figure 5:
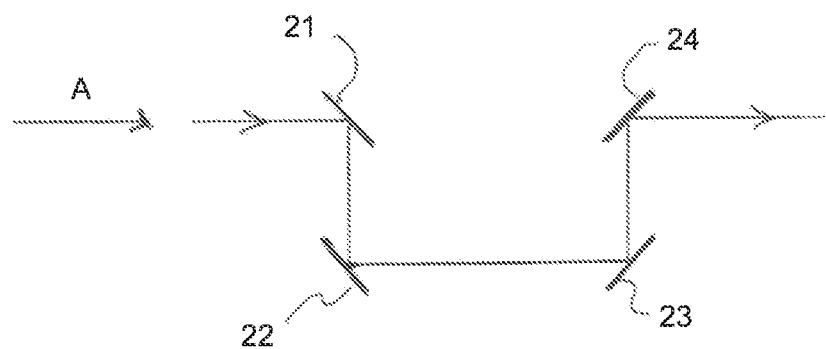
FIG. 5 schematically shows the arrangement of four mirrors according to the invention corresponding with FIG. 1.
Figure 6:
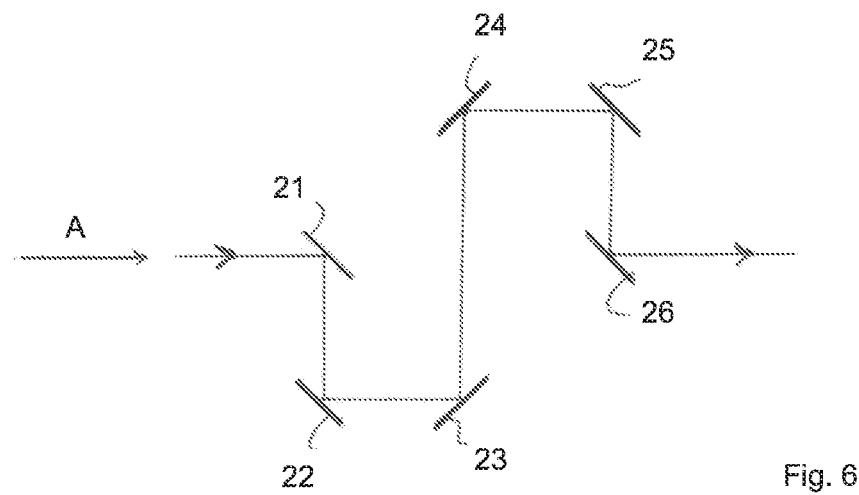
FIG. 6 schematically shows an arrangement of six mirrors according to the invention FIG. 7 schematically shows an interferometer arrangement including a refocusing device according to the invention.

In FIG. 5, the configuration of mirrors shown in FIG. 1 and FIG. 4 is schematically illustrated. This configuration includes four mirrors 21-24. In contrast, the alternative configuration of mirrors schematically shown in FIG. 6 includes six mirrors 21-26. As can be seen, in the configuration of FIG. 6 the mirrors are also arranged in such a way that the light incident on the first mirror 21 and the light reflected by the sixth mirror 26 are substantially coincident with or at least both parallel to the optical axis A. In the configuration of FIG. 6, at least one of the mirrors 21-26 may be curved to provide optical power, thus eliminating the need for a lens. Although mirror 21 may be curved, one of the other mirrors may be curved instead or as well, for example mirror 26.

In summary, the device according to the invention has a focusing capability and is therefore capable of adjusting a (spherical) wave front error (WFE). That is, a focusing error can be compensated. This focusing capability may be achieved by providing at least one of the mirrors with a curvature, for example a concave curvature. Such a curvature and the resulting optical strength may be small, for example in the order of F/50.

The invention makes use of an assembly of an even number of mirrors, for example four mirrors, such that the input and output beam may be co-aligned both in beam direction and beam location. At least one of the four mirrors may have a (preferably slight) curvature, so that a lateral shift of the four-mirror assembly can be used to control focus. This configuration is such that shifts and rotations of the mirror assembly (at least in a first approximation) do not affect the optical path length.

The main part of the refocusing device is a mirror assembly consisting of four mirrors. This mirror assembly can be shifted along an optical axis by a 1D mechanical guidance by an actuator (15 in FIG. 1). An additional position sensor (14 in FIG. 1) allows active position control.

Figure 7:
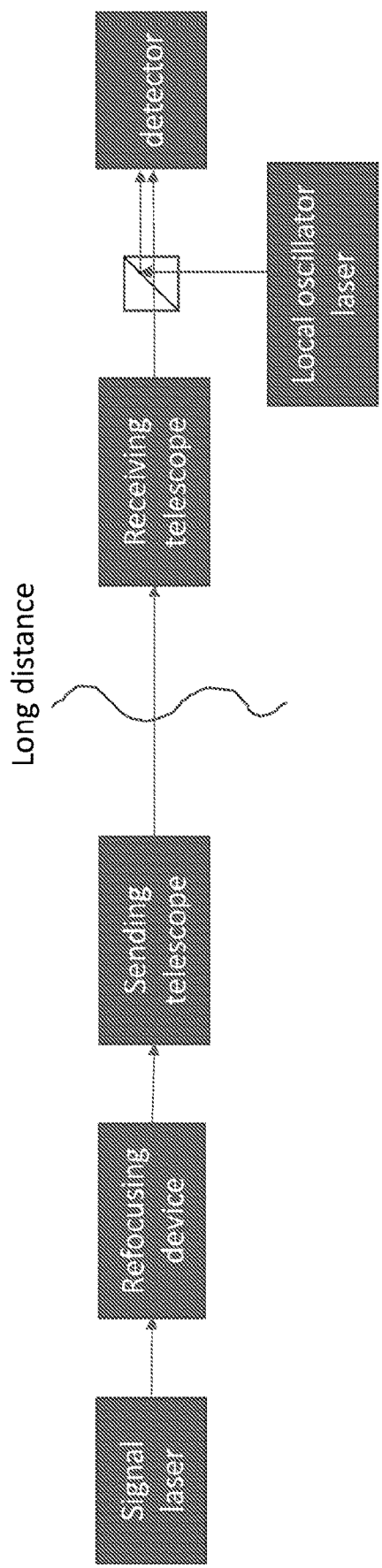

As shown in FIG. 7, the focusing device of the invention may be used for the active control of the focus error inside a interferometer, allowing the optical path length to remain stable within about 1 pm/sqrt(Hz). An interferometer provided with the focusing device of the invention may advantageously be used in space application, for example in satellites. By actuating the refocusing device along the optical axis, a wave front error can be reduced by slightly focusing the laser beam of the signal laser.

It will be understood by those skilled in the art that the invention is not limited to the embodiments described above and that many modification and additions may be made without departing from the scope of the appending claims.

The invention claimed is:

1. A focusing device, comprising:
   a base unit; and
   a mirror unit,
   wherein the mirror unit is translatable, relative to the base unit, parallel to an optical axis of the focusing device,
   wherein the mirror unit is configured to receive incident light along the optical axis in a first direction and to reflect the incident light parallel with the optical axis in said first direction, wherein the mirror unit comprises an even number of mirrors,
   wherein at least one of the mirrors is curved, and
   wherein the number of mirrors is equal to at least four.

2. The focusing device according to claim 1, wherein the number of mirrors equals four.

3. The focusing device according to claim 1, wherein the mirrors are arranged such that the incident light is received by a first mirror and reflected to a second mirror, wherein the second mirror reflects the light to a third mirror, and wherein the third mirror reflects the light to a fourth mirror.

4. The focusing device according to claim 3, wherein the first mirror and the second mirror are parallel to each other, and wherein the third mirror and the fourth mirror are parallel to each other.

5. The focusing device according to claim 3, wherein the first mirror and the fourth mirror together define an angle of approximately 90°.

6. The focusing device according to claim 3, wherein the first mirror is curved so as to provide optical power.

7. The focusing device according to claim 6, wherein the first mirror is concave.

8. The focusing device according to claim 7, wherein the first mirror has an optical power between F/30 and F/70.

9. The focusing device according to claim 7, wherein the first mirror has an optical power of approximately F/50.

10. The focusing device according to claim 1, wherein the mirrors are mounted on a single hollow support structure.

11. The focusing device according to claim 1, further comprising an actuator that translates the mirror unit relative to the base unit.

12. The focusing device according to claim 1, further comprising a position sensor that senses the position of the mirror unit relative to the base unit.

13. An interferometer comprising a focusing device, wherein the focusing device comprises:
   a base unit; and
   a mirror unit,
   wherein the mirror unit is translatable, relative to the base unit, parallel to an optical axis of the focusing device,
   wherein the mirror unit is configured to receive incident light along the optical axis in a first direction and to reflect the incident light parallel with the optical axis in said first direction, wherein the mirror unit comprises an even number of mirrors,
   wherein at least one of the mirrors is curved, and
   wherein the number of mirrors is equal to at least four.

\* \* \* \* \*